United States Patent
Lee et al.

(10) Patent No.: US 9,372,955 B1
(45) Date of Patent: Jun. 21, 2016

(54) METHOD, SYSTEM, AND COMPUTER PROGRAM PRODUCT FOR IMPLEMENTING REPETITIVE TRACK PATTERNS FOR ELECTRONIC CIRCUIT DESIGNS

(71) Applicant: Cadence Design Systems, Inc., San Jose, CA (US)

(72) Inventors: Yinnie Lee, Campbell, CA (US); Jeffrey Markham, San Jose, CA (US); Roland Ruehl, San Carlos, CA (US); Karun Sharma, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 183 days.

(21) Appl. No.: 14/292,122

(22) Filed: May 30, 2014

(51) Int. Cl.
*G06F 17/50* (2006.01)

(52) U.S. Cl.
CPC ........ *G06F 17/5081* (2013.01); *G06F 17/5072* (2013.01); *G06F 17/5077* (2013.01); *G06F 17/5068* (2013.01)

(58) Field of Classification Search
None
See application file for complete search history.

(56) References Cited

U.S. PATENT DOCUMENTS

| | | | |
|---|---|---|---|
| 5,598,343 A | 1/1997 | Roy | |
| 5,793,643 A | 8/1998 | Cai | |
| 8,316,326 B1 * | 11/2012 | Pierrat | G03F 1/70 716/50 |
| 8,707,223 B2 * | 4/2014 | Blatchford | G06F 17/5077 716/55 |
| 8,782,570 B1 * | 7/2014 | Li | G06F 17/5077 716/51 |
| 8,871,104 B2 * | 10/2014 | Park | H01L 21/0337 216/41 |
| 9,141,751 B2 * | 9/2015 | Lee | G06F 17/5081 |
| 9,158,885 B1 * | 10/2015 | Gray | G06F 17/5081 |
| 2002/0069396 A1 | 6/2002 | Bhattacharya | |
| 2003/0005399 A1 | 1/2003 | Igarashi | |
| 2015/0234974 A1 * | 8/2015 | Dechene | G06F 17/5081 716/52 |

OTHER PUBLICATIONS

Non-Final Office Action dated Mar. 21, 2016 for U.S. Appl. No. 14/318,488.
Non-Final Office Action dated Mar. 29, 2016 for U.S. Appl. No. 14/231,688.

\* cited by examiner

*Primary Examiner* — Leigh Garbowski
(74) *Attorney, Agent, or Firm* — Vista IP Law Group, LLP

(57) ABSTRACT

Methods and systems for implementing repetitive track patterns for electronic designs are disclosed. The method determines a track pattern within a period and repeats the track pattern for a number of times to form repetitive track patterns. Compliance with photomask designation design rules and track pattern design rules by both the track pattern and the repetitive track patterns is maintained by adding one or more intermediate tracks. A track may be added or removed from the track pattern or replaced by another track associated with a different width by using one or more intermediate tracks. The method may validate a period and replace an invalid period with a valid period. During the identification of the tracks in a track pattern for constructing repetitive track patterns, the method also forward predicts a predetermined number of tracks or predicts one or more tracks for a predetermined distance.

20 Claims, 15 Drawing Sheets

| Widths | Widths + MinSpacing | Period = 1000 max(ai) | Size of Combinatorial Space |
|---|---|---|---|
| 32 | 56 | 17 | 17 |
| 34 | 58 | 17 | 289 |
| 38 | 62 | 16 | 4624 |
| 40 | 64 | 15 | 69360 |
| 46 | 70 | 14 | 971040 |
| 58 | 82 | 12 | 11652480 |
| 62 | 86 | 11 | 128177280 |
| 70 | 94 | 10 | 1281772800 |
| 76 | 100 | 10 | 12817728000 |
| 78 | 102 | 9 | 115359552000 |
| 86 | 110 | 9 | 1038235968000 |

FIG. 7C

METHOD, SYSTEM, AND COMPUTER PROGRAM PRODUCT FOR IMPLEMENTING REPETITIVE TRACK PATTERNS FOR ELECTRONIC CIRCUIT DESIGNS

CROSS REFERENCE TO RELATED APPLICATION(S)

This application is related to U.S. patent application Ser. No. 14/231,688 entitled "METHOD, SYSTEM, AND COMPUTER PROGRAM PRODUCT FOR IMPLEMENTING TRACK PATTERN SYNTHESIS FOR ELECTRONIC CIRCUIT DESIGNS" and filed on Mar. 31, 2014, U.S. patent application Ser. No. 14/292,067 entitled "METHOD, SYSTEM, AND COMPUTER PROGRAM PRODUCT FOR IMPLEMENTING TRACK PATTERNS FOR ELECTRONIC CIRCUIT DESIGNS", and U.S. patent application Ser. No. 14/292,166 entitled "METHOD, SYSTEM, AND COMPUTER PROGRAM PRODUCT FOR INTERCONNECTING CIRCUIT COMPONENTS WITH TRACK PATTERNS FOR ELECTRONIC CIRCUIT DESIGNS". The content of the aforementioned U.S. patent applications is hereby expressly incorporated by reference in its entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In an effort to deal with and simplify otherwise extremely complex design rules at advanced process rules, foundries are now turning to a different approach in which routing regions of a design on any particular metal layer are performed only on a set of specific metal tracks, each of which may only take on width values from a discrete set of legal widths that may be made available in the process Design Rule Manual (DRM). Furthermore, in order to facilitate self-aligned double patterning (SADP) processes and deal with mask designation issues, additional constraints may be created by which track widths may be selected. For example, after a first track is chosen and assigned a mask color (e.g. B for Blue), the next track may need to be assigned a different color (e.g., C for Cyan), and may only take one of a discrete set of legal width values, where that set in turn is a function of the preceding B track width.

An electronic design may correspond to and thus include more than ten different size wires, and the tracks for the electronic design may thus be associated with as many legal widths. Any attempt to manually figure out which track associated with a given width may be immediately neighboring another track associated with a given width is nearly impossible due to the sheer number of different possible legal combinations of tracks, especially in light of the extremely complex design rules that govern what track patterns are legal. Therefore, generating a legal track pattern including a plurality of tracks associated with some legal widths is nearly impossible to be performed manually, especially when an electronic design includes more than a few legal or permissible widths. Repetitive track patterns present further issues in that each track pattern needs to comply with the governing design rules and constraints for track patterns, and the repetitive track patterns as a whole also needs to comply with the same set of governing design rules and constraints. Any additions or removal of one or more tracks to a track pattern may propagate throughout the repetitive track patterns, even if a single track pattern may comply with all the pertinent design rules and constraints.

Therefore, there exists a need for effective and efficient techniques to implement repetitive track pattern for electronic circuit designs.

SUMMARY

Disclosed are method(s), system(s), and article(s) of manufacture for implementing repetitive track patterns for electronic circuit designs in one or more embodiments. Some embodiments are directed at a method for implementing repetitive track patterns for electronic circuit designs. These methods may use a computer to execute a sequence of instructions to identify an electronic design and a database that includes a plurality of legal combinations of widths or a plurality of legal track patterns. A track pattern includes one or more tracks, each of which may be associated with a width. The method may further identify a period that accommodates a track pattern and repeat the occurrence of the track pattern in the period for multiple occurrences to generate the repetitive track patterns having the identical track pattern in each period. At least a part of a legal track pattern satisfying pertinent design rules may be identified for the period. The method determines whether the repetitive track patterns violate one or more design rules, although the track pattern itself satisfies these one or more design rules. One or more fixes may be performed on the track pattern, rather on the repetitive track patterns, to resolve the violations of the one or more design rules.

Some embodiments are directed at a hardware module or system that may be invoked to perform any of the methods, processes, or sub-processes disclosed herein. The hardware system may include a track pattern processing module, a track pattern database enumeration and maintenance module, an implementing option processing module, a track pattern generation module, and/or a track pattern evaluation module in some embodiments. The hardware system may further include one or more forms of non-transitory machine-readable storage media or devices to temporarily or persistently store various types of data or information such as the firmware. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing track patterns for electronic circuit designs are described below with reference to FIGS. 1-8.

BRIEF DESCRIPTION OF THE DRAWINGS

The drawings illustrate the design and utility of various embodiments of the invention. It should be noted that the figures are not drawn to scale and that elements of similar structures or functions are represented by reference numerals throughout the figures. In order to better appreciate how to obtain the above-recited and other advantages and objects of various embodiments of the invention, a more detailed description of various embodiments briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 7C illustrates an illustrative table including a plurality of legal widths and respective sizes of the combinatorial space with a constant spacing value in some embodiments.

DETAILED DESCRIPTION

Various embodiments of the invention are directed to a methods, systems, and articles of manufacture for implementing repetitive track patterns for electronic circuit designs. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of various embodiments described herein. Where certain elements of some embodiments may be partially or fully implemented using known components (or methods or processes), only those portions of such known components (or methods or processes) that are necessary for an understanding of various described embodiments will be described, and the detailed descriptions of other portions of such known components (or methods or processes) will be omitted so as not to obscure the invention. Further, various embodiments encompass present and future known equivalents to the components referred to herein by way of illustration.

Figure 1:
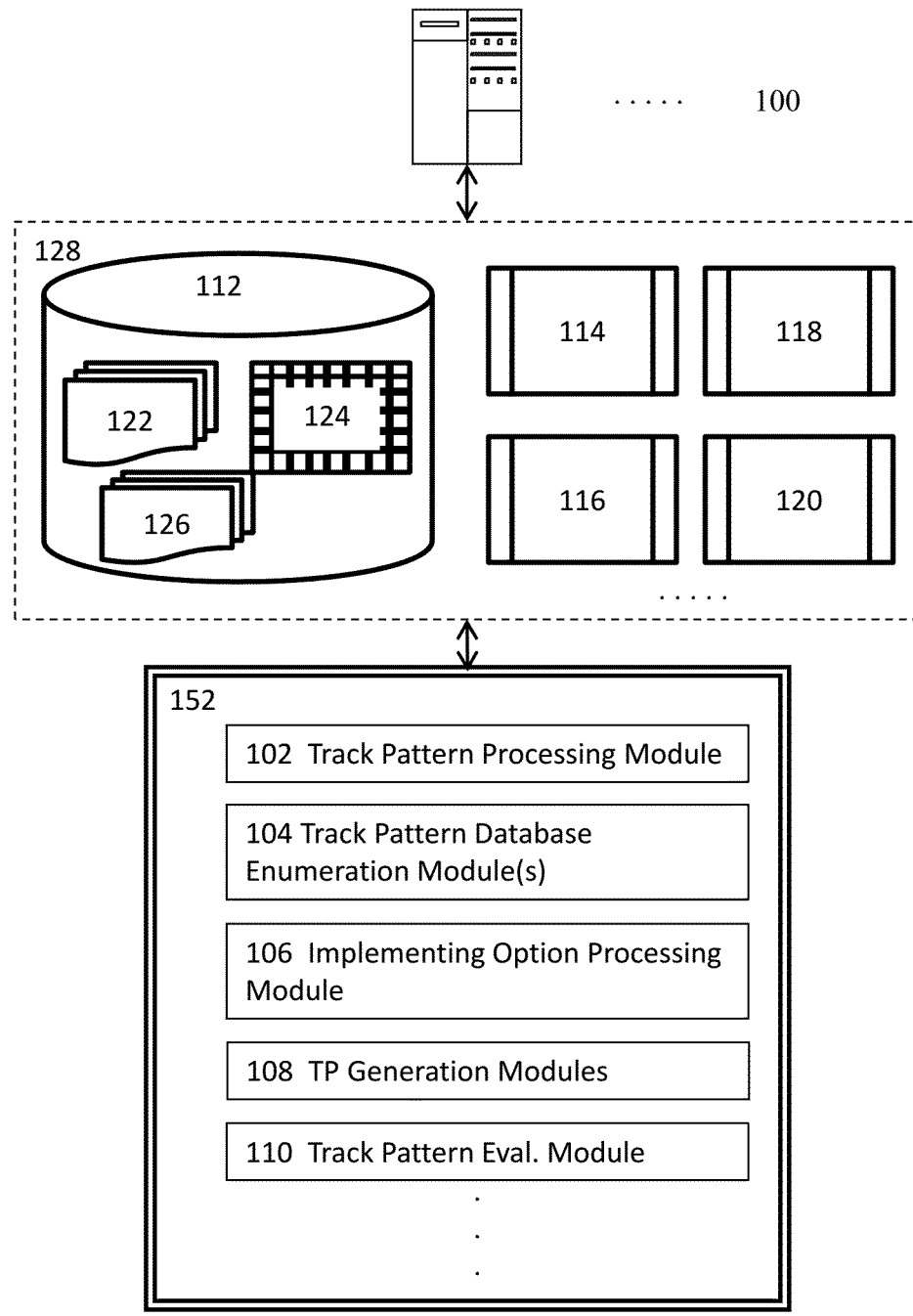
FIG. 1 illustrate a illustrative high level schematic block diagrams for a system for implementing repetitive track patterns for electronic circuit designs in some embodiments.

Disclosed are method(s), system(s), and article(s) of manufacture for implementing track patterns for electronic circuit designs in one or more embodiments. FIG. 1 illustrates an illustrative high level schematic block diagrams for implementing repetitive track patterns for electronic designs. In one or more embodiments, FIG. 1 illustrates an illustrative high level schematic block diagrams for implementing repetitive track patterns for electronic designs and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a floorplanner, a global routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises one or more track pattern processing modules 102 to insert, remove, modify, improve, optimize, or otherwise operate upon tracks or routing tracks in track patterns, one or more track pattern database enumeration and maintenance modules 104 to enumerate, determine, or update legal track pattern database(s) to generate viable implementing options for track associated with various widths, one or more implementing option processing modules 106 to identify, determine, modify, or rank viable implementing options for various tracks and/or track patterns, one or more track pattern generation and prediction modules 108 to generate, update, modify, or otherwise perform various operations on track patterns and/or to forward predict subsequent additions of tracks into a track pattern, and one or more track pattern evaluation modules 110 to evaluate track patterns against various design rules, performance objectives, manufacturing requirements, or other constraints.

A routing track or simply a track (hereinafter a "track") includes a one-dimensional fictitious line or line segment derived from the manufacturing grids provided by foundries. A routing track thus having zero width in physical designs (e.g., a layout of an electronic design) and is used to guide physical implementation tools (e.g., floorplanner, placement tools, or routing tools) to implement the physical design for an electronic design. For example, a routing tool may lay the centerline of a wire segment along a routing track during the routing process. A routing track may nonetheless be associated with a width to indicate that the particular routing track is to be used to route wires having the associated width. In this application, some routing tracks may be illustrated as rectangular shapes to indicate that such routing tracks are associated with the widths as shown in various figures. Nonetheless, the rectangular representations of such routing tracks are not intended to explicitly, implicitly, or inherently indicate that routing tracks have two-dimensional geometrical structures or shapes. A track pattern includes a collection of one or more tracks running in parallel and arranged in a certain sequence or order.

Figure 2:
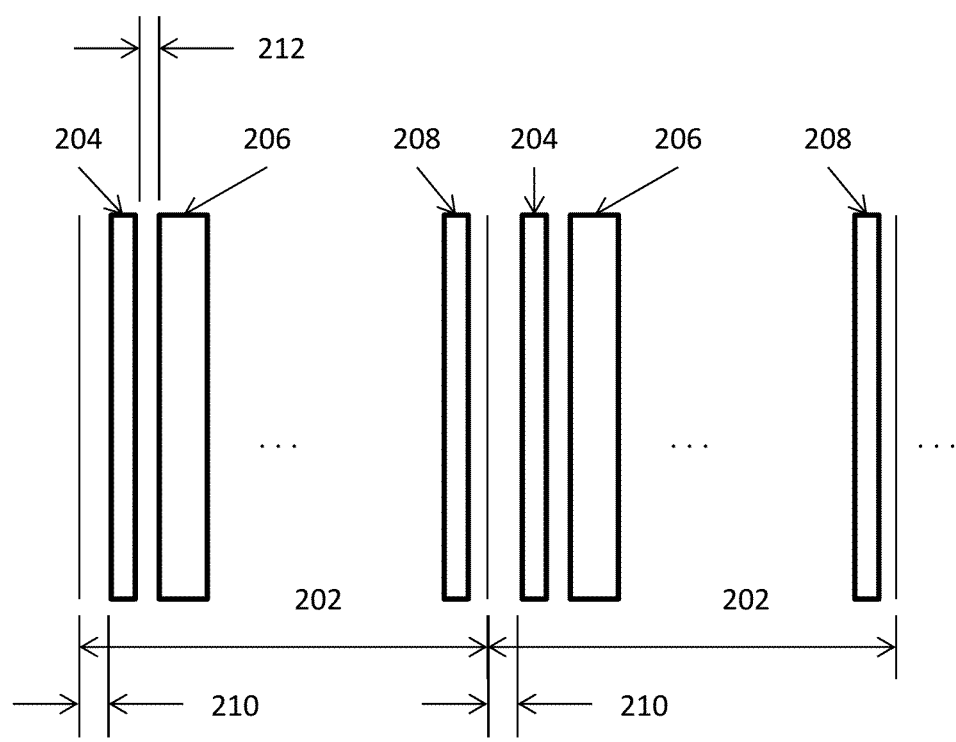
FIG. 2 illustrates a brief introduction to a set of repetitive track patterns in some embodiments.

FIG. 2 illustrates a brief introduction to a set of repetitive track patterns in some embodiments. More specifically, FIG. 2 shows two or more repetitive track patterns, each spans across a period 202. The first track 204 in the first track pattern may be situated at an offset 210 from the corresponding period line defining a boundary of the period. The offset 210 may include a non-negative integer. In some embodiments, the offset may include an even integer. For the ease of explanation and illustration, two immediately neighboring tracks are spaced apart with a constant spacing value 212 although the spacing needs not be constant in other embodiments. Each track pattern includes a plurality of track 204, 206 . . . 208 with track 204 being the first track in the pattern from the left and track 208 being the last track in the track pattern.

In addition to the spacing design rule, each track pattern in the repetitive track patterns is also required to satisfy a set of other design rules such as the pair rules or BC rules where B stands for blue and C stands for cyan in double patterning governing which two-width combinations are legal, the triplet rules or BCB (Blue-Cyan-Blue) rules governing which three-width combinations are legal, one or more other design rules such as a minimum length rule governing the minimum length required for an interconnect segment, a same track line-end design rule, a different track line-end design rule, a keep-out design rule, etc. In addition, each track pattern in the repetitive track patterns satisfies the constraint that requires the summation of all the widths associated with all the tracks and the spacing values in the track pattern be equal to the periodicity which denotes the width of the period 202. That is, each track pattern in the repetitive track patterns satisfies the following constraint relation:

$$P = \text{offset} + \Sigma_{i=1}^{N}(a_i \times (w_i + s)) \quad (1)$$

In the above relation, $a_i$ denotes a non-negative integer, $w_i$ denotes the width associated with the i-th track in the track pattern, offset denotes the offset of the first track from a period line of the period encompassing the track pattern, N denotes the total number of tracks in the track pattern and may vary depending upon the selections of tracks, and P denotes the periodicity of the period.

It shall be noted that although track 208 illustrated in FIG. 2 appears to be offset from the right period line of the period 202, the boundary of track 208 may in fact coincides with the right period line. In other words, the offset between track 208 and the right period line is shown in FIG. 2 for the ease and clarity of illustration and explanation. Moreover, the overall repetitive track patterns also satisfy the same or substantially the same set of design rules. For example, the last track 208 in the left track pattern and the first track 204 in the right track pattern also satisfy the BC rules or pair rules by having correct photomask designations and a legal combination of widths associated with these two tracks. Similarly, the last two tracks of the left track pattern and the first two tracks of the immediately neighboring track pattern on the right also satisfy the BCB or triplet rules by having correct photomask designations and a legal combination of widths associated with these two tracks.

Figure 3:
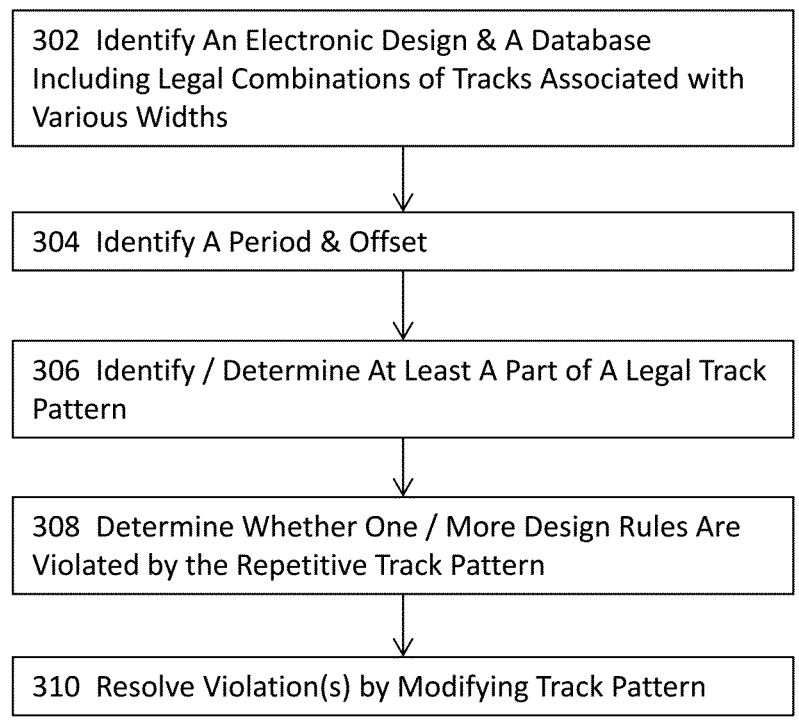
FIG. 3 illustrates a high level flow diagram for a method or system for implementing repetitive track patterns for electronic circuit designs in some embodiments.

FIG. 3 illustrates a high level flow diagram for a method or system for implementing repetitive track patterns for electronic circuit designs in some embodiments. In these embodiments illustrated in FIG. 3, the method or system may identify an electronic design or a portion thereof and a database including a plurality of legal combinations of tracks associated with various widths or a plurality of legal track patterns at 302. A portion of an electronic design identified at 302 may include a cell, a block, an instance of a cell or block, or an area in the electronic design. At 304, the method or system may identify a period and offset for implementing a track pattern within the period.

The period is associated with a periodicity which represents the width of the period for accommodating a track pattern. The offset includes a non-negative integer to indicate the spacing between the first track (e.g., an edge of the first track) and a period line. At 306, the method or system may identify or determine at least a part of a legal track pattern with the identified period and offset. In some of the embodiments illustrated in FIG. 3, a pre-seeded yet partial track pattern may be identified for the period from, for example, a customer which desires to have a particular combination of tracks in a track pattern in some embodiments.

The pre-seeded track pattern may only include some but not all of the tracks to occupy the entire period while satisfying various design rules, requirements, or constraints (collectively design rule or design rules hereinafter). In these embodiments, the method or system is to identify or determine the remaining tracks for the track pattern in the period for a number of repetitions while satisfying such design rules at 306. At 308, the method or system may determine whether or not one or more design rules are violated by the repetitive track patterns having multiple occurrences of the same track pattern within the period. In these illustrated embodiments, the method or system may first identify or determine a legal track pattern, with or without one or more pre-seeded tracks, within the period at 306.

The method or system may then determine whether the repetitive track patterns in immediately neighboring periods for a number of repetitions violate any design rules at 308. That is, although the track pattern identified or determined at 306 is considered a legal track pattern within the period, the repetitive track patterns for a number of repetitions may nevertheless violate one or more design rules. Identifying a track pattern with an offset within an area is described in greater details in the U.S. patent applications identified in the CROSS-REFERENCE TO RELATED APPLICATION section. At 310, the method or system may resolve the violations identified at 308. More details about the identification, determination, and resolution of violations of design rules will be described below with reference to at least FIGS. 4-6.

Figure 4:
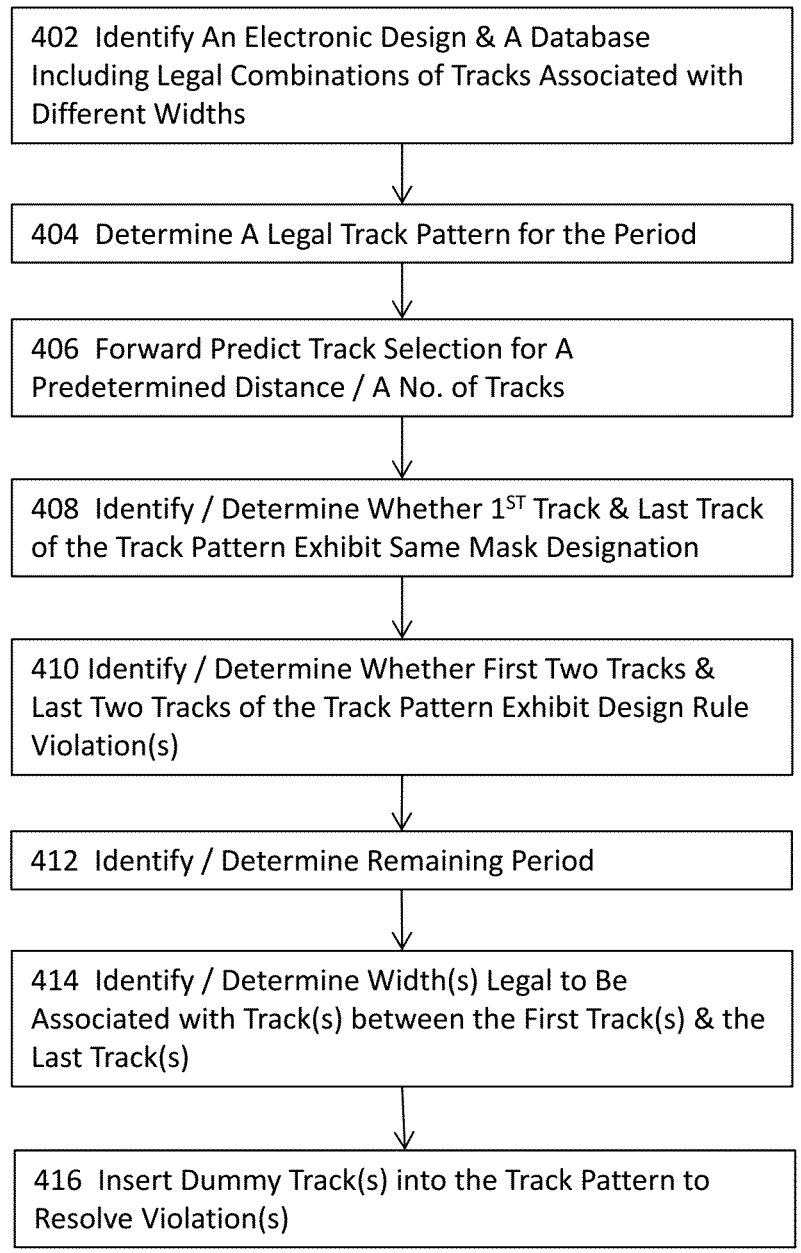
FIG. 4 illustrates a more detailed flow diagram for a method or system for implementing repetitive track patterns for electronic circuit designs in some embodiments.

FIG. 4 illustrates a more detailed flow diagram for a method or system for implementing repetitive track patterns for electronic circuit designs in some embodiments. In these embodiments illustrated in FIG. 4, the method or system may identify an electronic design or a portion thereof at 402 in identical or substantially similar manners as those described for reference numeral 302 of FIG. 3. The method or system may also identify a period for a track pattern and a database including a plurality of legal combinations of tracks associated with various widths or a plurality of legal track patterns. More details about the database are described in U.S. patent application Ser. No. 14/292,067 entitled "METHOD, SYSTEM, AND COMPUTER PROGRAM PRODUCT FOR IMPLEMENTING TRACK PATTERNS FOR ELECTRONIC CIRCUIT DESIGNS", the content of which is expressly incorporated by reference in its entirety for all purposes.

At 404, the method or system may identify or determine a legal track pattern for the period identified at 402. In some of these embodiments, the method or system may forward predict track selections for a predetermined distance within the period or for a predetermined number of tracks for the identification or selection of a track for the track pattern at 406. In some of these embodiments, the method or system may predict the selections or identifications of the next five or fewer tracks for each identification or selection of a track for the track pattern. For each set of permissible widths to be associated with tracks in legal track patterns, there exists a threshold period beyond which the possible number of legal track patterns grows exponentially with the periodicity of the threshold period. That is, for any periods shorter than or equal to the threshold period, only a few legal combinations of tracks may be arranged within such a period.

Figure 7A:
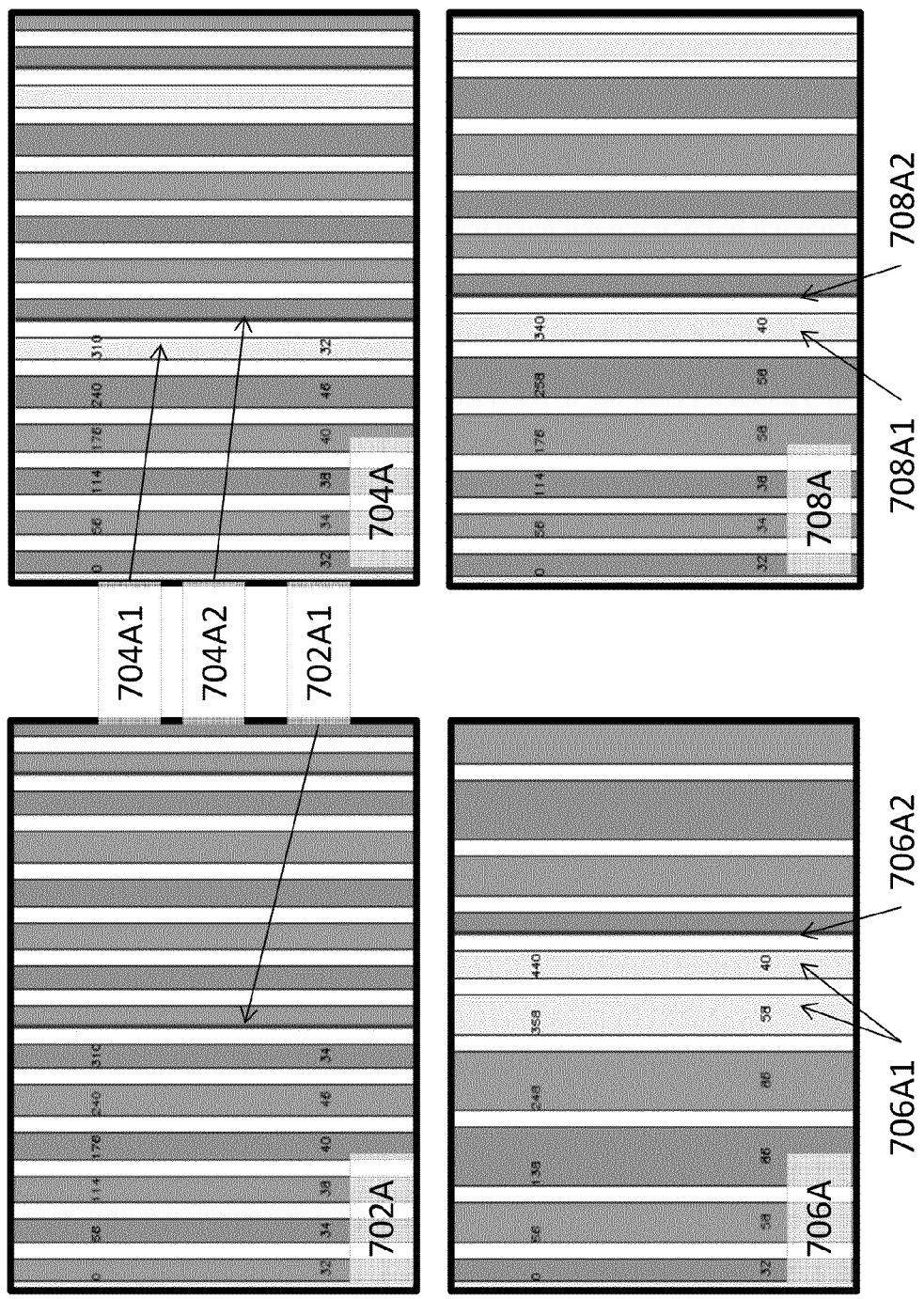
FIG. 7A illustrates some illustrative regions including repetitive track patterns of a simplified electronic design to which various methods or systems for implementing repetitive track patterns applies in some embodiments.
Figure 7B:
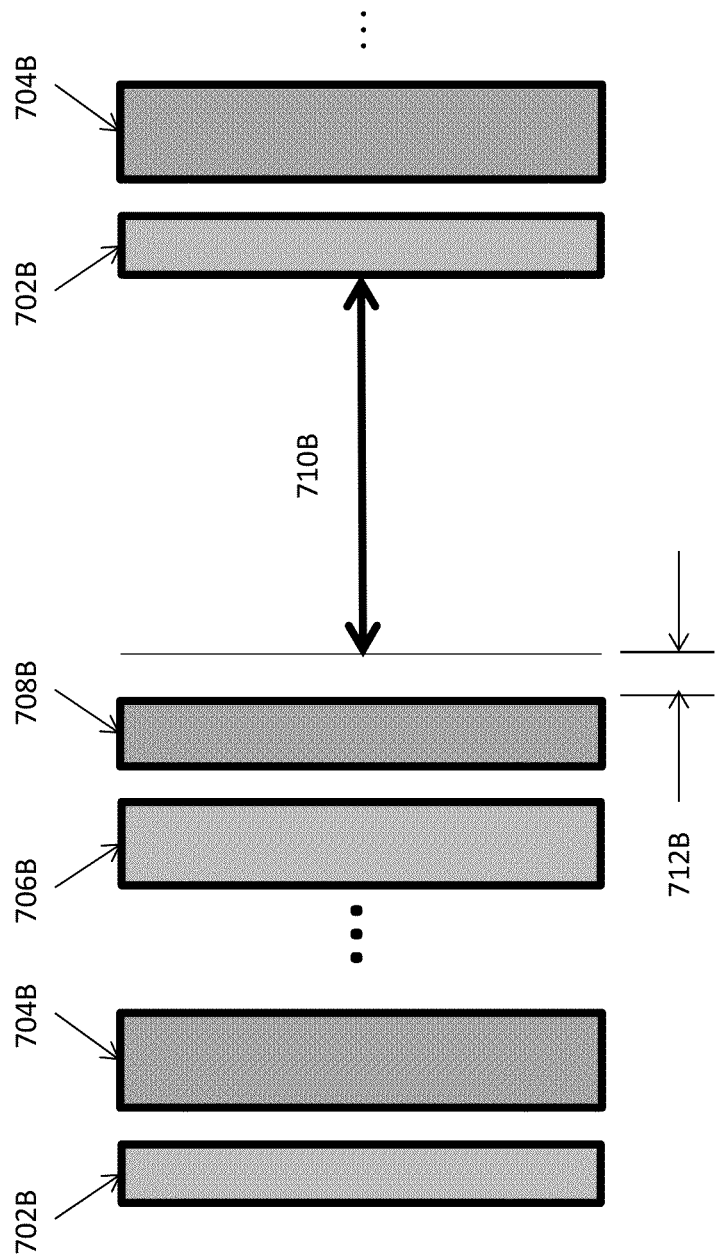
FIG. 7B illustrates an illustrative region including repetitive track patterns in some embodiments.
Figure 7D:
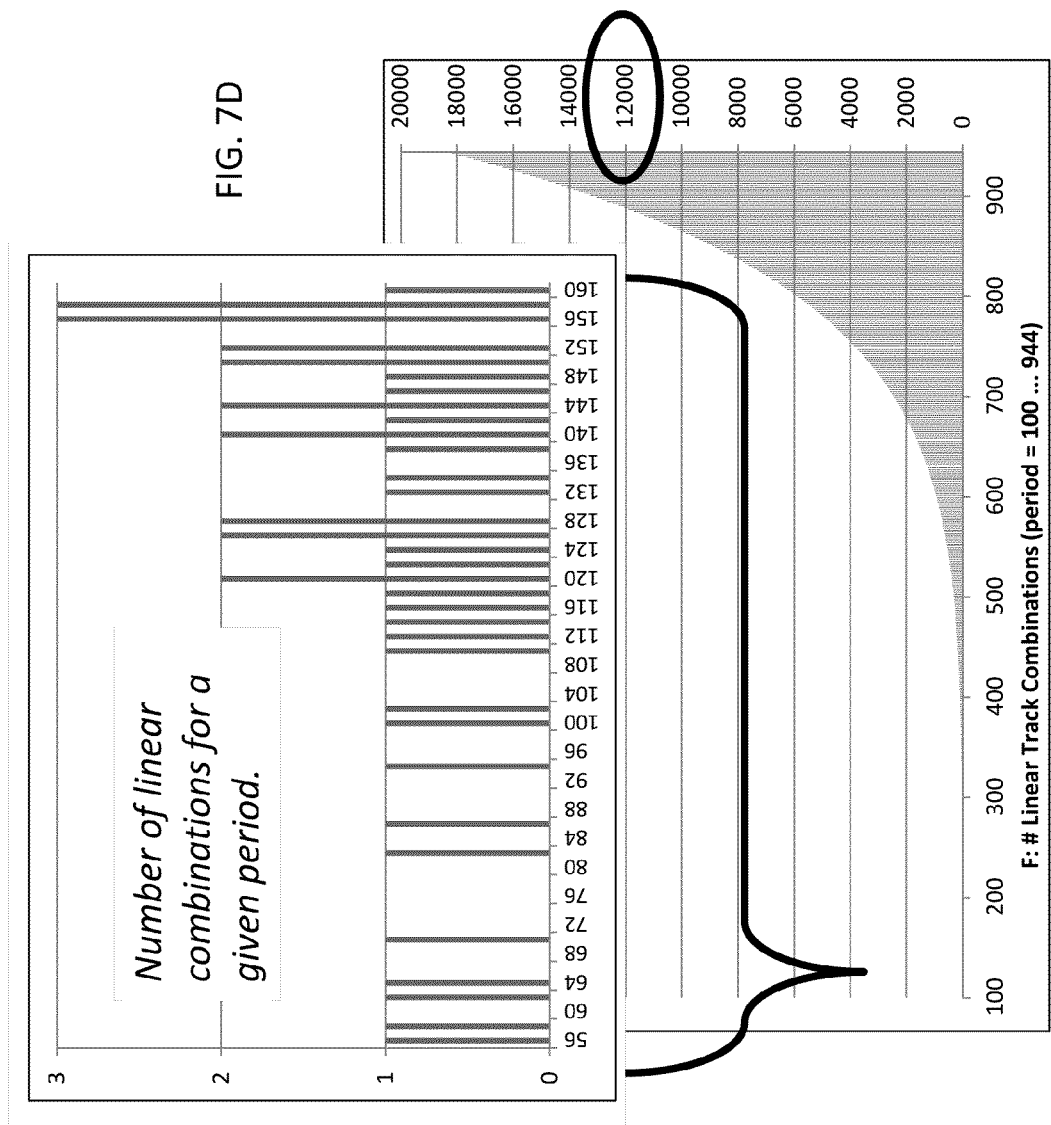
FIG. 7D illustrates an illustrative plot showing the number of linear combinations for a given periods with the plurality of legal widths and constant spacing value provided in FIG. 7C in some embodiments.
Figure 7E:
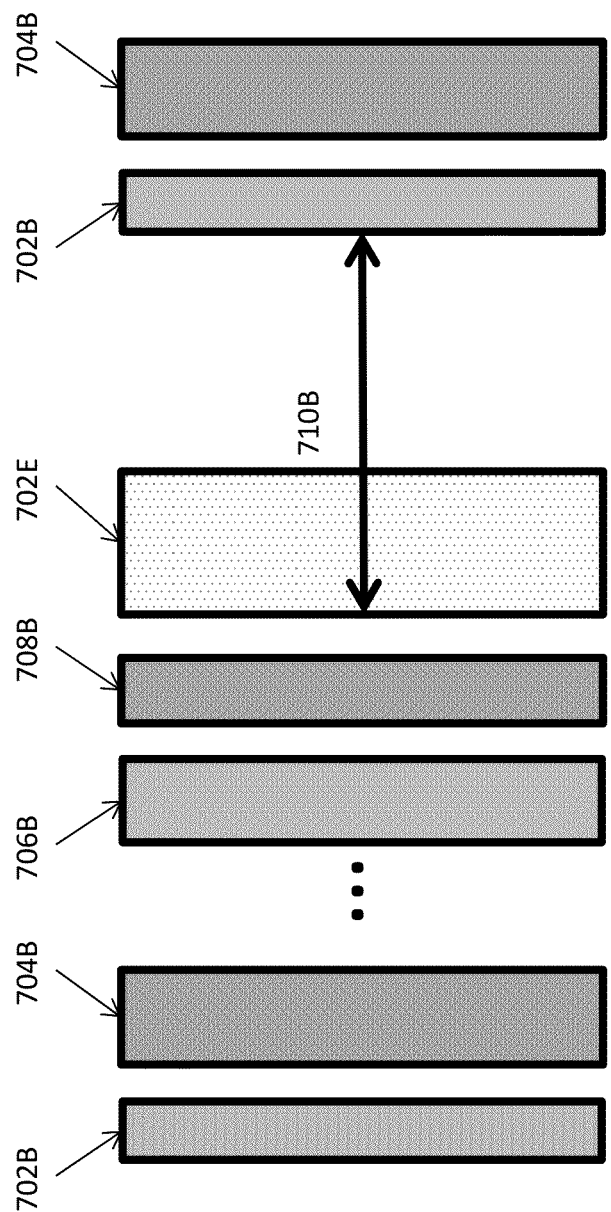
FIG. 7E illustrates an illustrative region including repetitive track patterns illustrated in FIG. 7B and some operations of implementing repetitive track patterns in some embodiments.
Figure 7F:
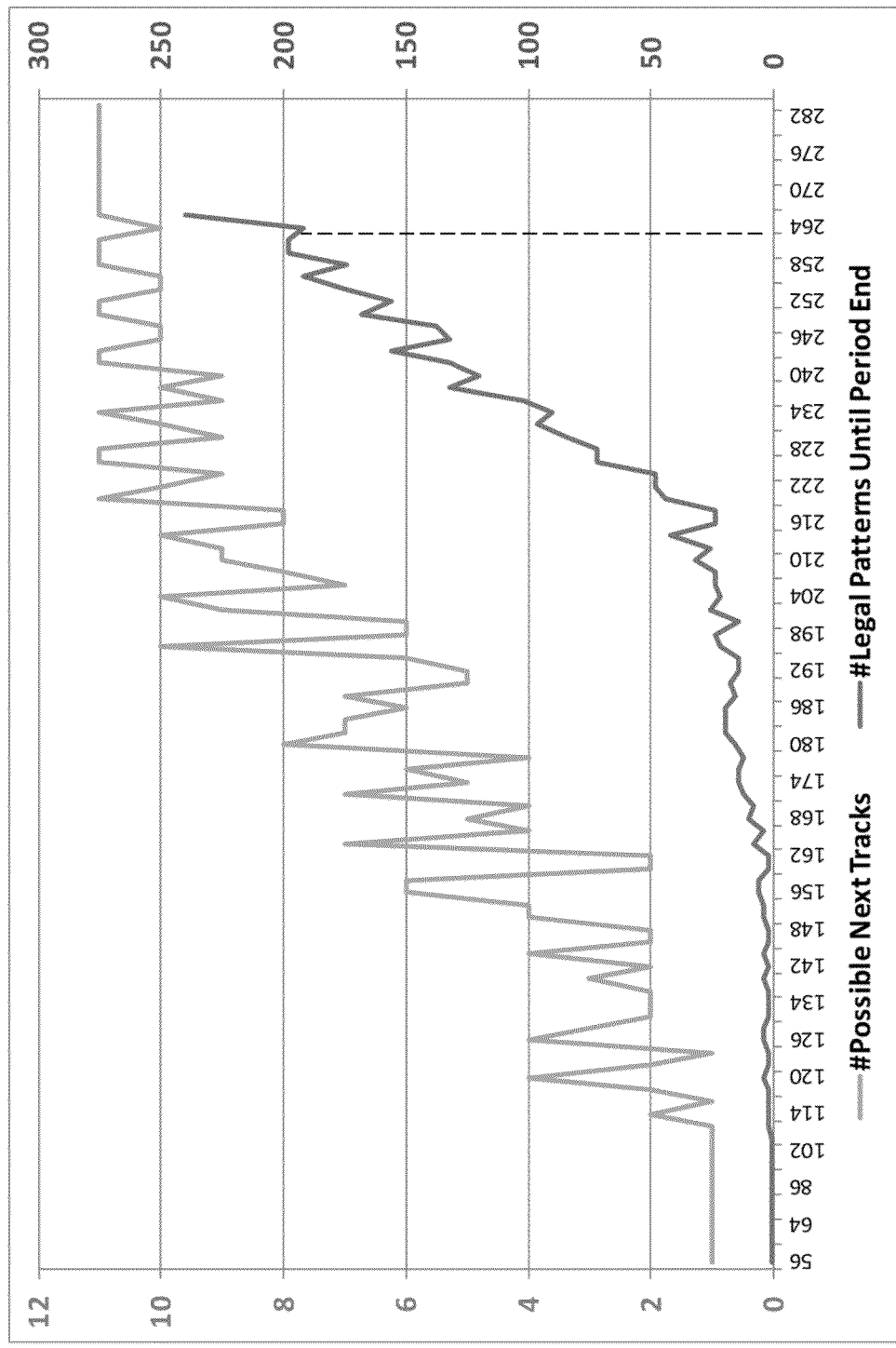
FIG. 7F illustrates an illustrative plot showing the number of linear combinations for a given periods with the range of 56 to 282 with the plurality of legal widths and constant spacing value provided in FIGS. 7C-D in some embodiments.

For example, with the set of permissible widths to be associated with tracks as shown in FIG. 7C, FIG. 7F shows that for a period shorter than or equal to 264-nm, the number of possible next track selections remains below 12, and the total number of legal track patterns until the end of the period remains to be some manageable numbers for each track selection. Nonetheless, the number of legal track patterns grows exponentially when the periodicity is beyond 264. Therefore, the method or system may thus predict a number of possible next track selections for a limited distance within the period for each track selection to further expedite the track pattern identification or determination for the period. It shall be noted that FIG. 7F is generated based at least in part on the information provided in FIG. 7C. Therefore, these numbers in the FIGS. 7C and 7F are not intended to limit the scope of other embodiments or the scope of the claims, unless otherwise specifically recited or claimed.

At 408, the method or system may identify or determine whether the first track and the last track of the track pattern comply with one or more relevant design rules. For example, the method or system may identify the first track and the last track and determine whether these two tracks have different photomask identifications. If these two track exhibit the same photomask identifications, the method or system may determine that there is a color violation because the first track of the second track pattern will be arranged immediately adjacent to the last track of the first track pattern in the repetitive track patterns. As another example, the method or system may consult the database identified at 402 or a pair-matrix or table including legal combinations of two widths associated with two immediately adjacent tracks and determine whether the respective widths associated with the first track and the last track constitute a legal combination of two widths for two immediately adjacent wires because the first track of the second track pattern will be arranged immediately adjacent to the last track of the first track pattern in the repetitive track patterns.

At 410, the method or system may identify the first two tracks and the last two tracks and determine whether or not the last track and the first two tracks as well as the last two tracks and the first track comply with the triplet rule that govern which combinations of three widths associated with three adjacent wires are legal once the repetitive track patterns are formed. In these embodiments, although the track pattern identified at 404 is legal and complies with all the pertinent design rules, the repetitive track patterns may nevertheless violate one or more design rules simply because of the repetitive arrangement of multiple such track patterns next to each other. The method or system may then identify the remaining period, if any, in the period at 412.

At 414, the method or system may identify one or more widths that may be legally associated with one or more tracks to be arranged after the last track and the first track of the track pattern. In some embodiments, the method or system may consult the database to identify these one or more widths to be associated with such one or more tracks. In some embodiments, the method or system will find the minimal number of tracks to transition from the last track of the track pattern to the first track of the next identical track pattern in the repetitive track patterns. At 416, the method or system may insert one or more intermediate tracks to the track pattern in the remaining period. In some embodiments where the method or system determines that the repetitive track patterns violate one or more design rules, although each track pattern is legal by itself, the method or system may use the remaining period to insert one or more intermediate tracks associated with appropriate widths.

For example, if the method or system determines that the first track and the last track violate the photomask designation design rule at 408, the method or system may identify one or more appropriate widths and insert one or more tracks after the last track of the track pattern in the remaining period to resolve the photomask identification violation by assigning appropriate photomask designations to these one or more intermediate tracks, while complying with other pertinent design rules. As another example, if the method or system determines that the first two tracks and the last two tracks of the track pattern may cause a violation of the triplet rule, the method or system may identify one or more appropriate widths and insert one or more tracks after the last track of the track pattern in the remaining period to resolve the triplet rule violation.

In some embodiments, various actions illustrated in FIG. 4 are performed even before any tracks or track patterns are actually implemented in the electronic design. In other words, the method or system may perform these actions for a single track pattern with a volatile memory and determine a legal track pattern such that the resulting repetitive track patterns are legal in the electronic design in these embodiments. In some other embodiments, the method or system may modify the electronic design as a track or a track pattern is identified and may perform various identifications or determinations to insert one or more intermediate tracks at 416 to each track pattern in the repetitive track patterns as needed.

In some embodiments where there may be multiple candidate widths for an intermediate track, the method or system may identify the candidate width for the intermediate track while minimizing the total number of different track patterns in the electronic design. For example, if another track pattern in another portion of the electronic design has been implemented with an intermediate track associated with a specific width, the method or system may thus identify this specific width for the track pattern identified at 404 without creating an additional, different track pattern for the electronic design.

Figure 5:
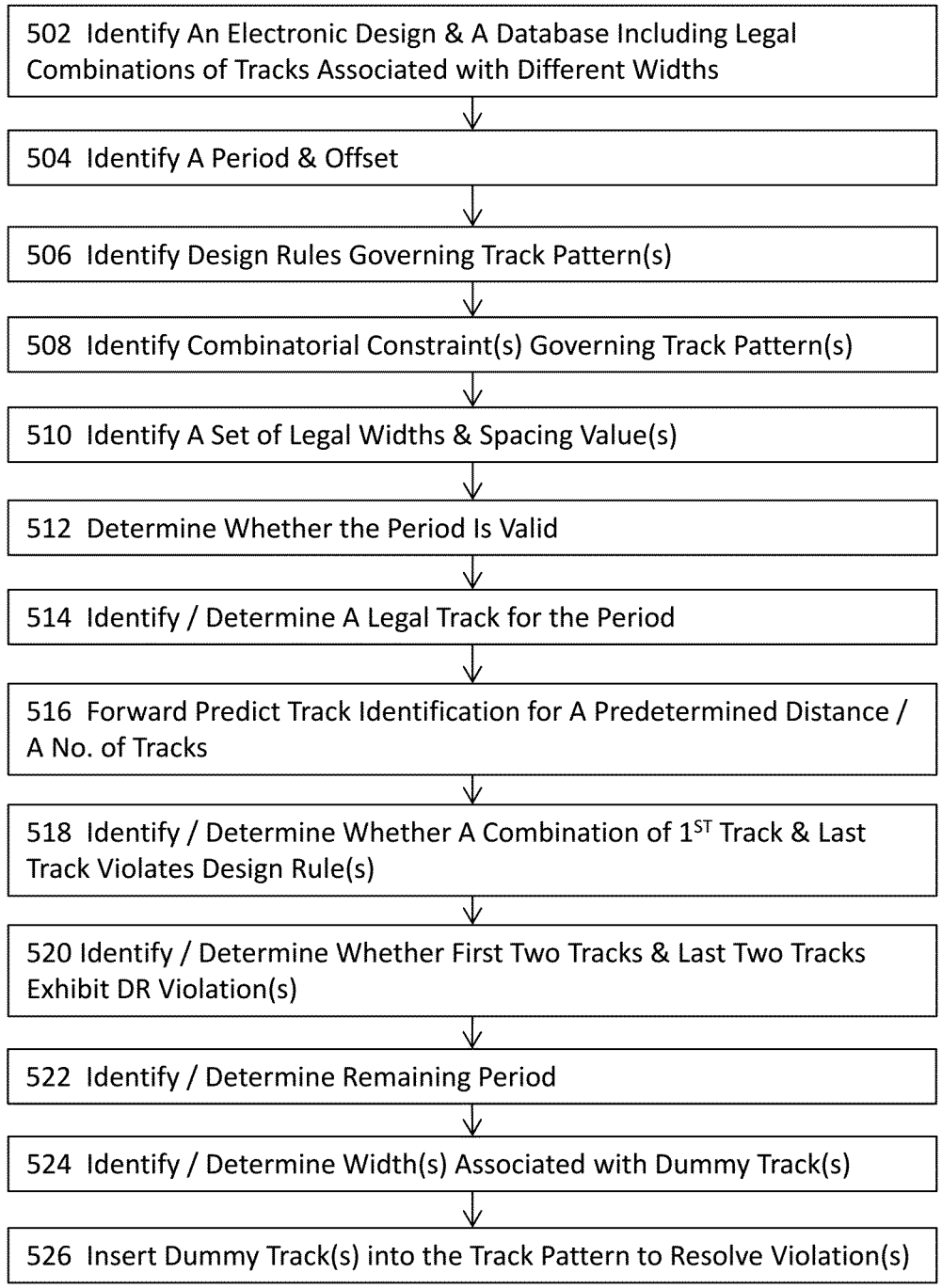
FIG. 5 illustrates another more detailed flow diagram for a method or system for implementing repetitive track patterns for electronic circuit designs in some embodiments.

FIG. 5 illustrates another more detailed flow diagram for a method or system for implementing repetitive track patterns for electronic circuit designs in some embodiments. In these embodiments illustrated in FIG. 3, the method or system may identify an electronic design or a portion thereof and a database including a plurality of legal combinations of tracks associated with various widths or a plurality of legal track patterns at 502. A portion of an electronic design identified at 502 may include a cell, a block, an instance of a cell or block, or an area in the electronic design. At 504, the method or system may identify a period and offset for implementing a track pattern within the period.

The period is associated with a periodicity which represents the width of the period for accommodating a track pattern. The offset includes a non-negative integer to indicate the spacing between the first track (e.g., an edge of the first track) and a period line. At 506, the method or system may identify a set of design rules governing track patterns or the implementation of the electronic design. The set of design rules may include, for example, the pair rules or BC rules where B stands for blue and C stands for cyan in double patterning governing which two-width combinations are legal, the triplet rules or BCB rules governing which three-width combinations are legal, one or more other design rules such as a minimum length rule governing the minimum length required for an interconnect segment, a same track line-end design rule, a different track line-end design rule, a keep-out design rule, etc.

At 508, a combinatorial constraint governing the track pattern within the period may be identified or determined. For example, the method or system may identify or determine the constraint as described in the constraint relation (1) in the description for FIG. 2 above. The method or system may further identify a set of legal widths and one or more spacing values at 510. In some embodiments, the track pattern to be implemented is to be subject to a constant spacing design rule where the spacing between any two immediately adjacent tracks is a constant value. In other embodiments, the spacing value between two immediately adjacent tracks need not be constant and may have multiple spacing values.

At 512, the method or system may further determine whether or not the period is valid. In various embodiments, the periodicity of a period needs to be larger than or equal to the sum of the smallest spacing value and the minimal permissible or legal width of a set of permissible or legal widths. For example, an electronic design may be required to use a set of 13 legal or permissible widths for all the wires in the electronic design. The method or system may thus use the sum of the smallest spacing value and the smallest width value to determine whether the periodicity of the period identified at 504 is greater than or equal to the sum in order to determine the legality of the period. If the period identified at 504 is smaller than the sum, the period may thus be determined to be invalid because no track may fit within the period. In some of the illustrated embodiments, the periodicity of a period may be an even integer. In these embodiments, the method or system may determine whether a period is valid by examining whether its periodicity is an even integer.

In some embodiments where the total number of tracks is known or provided beforehand, the method or system may determine whether the period falls within at least the upper bound and the lower bound as provided by the smallest and the largest widths as well as the smallest and the largest spacing values. In the example illustrated in FIG. 7C, the maximal width is 86, the smallest width is 32, and the spacing is fixed at 24. Given these numbers, if it is provided that the track pattern to be implemented includes ten tracks, the period must be bound by 536 (32*10+9*24) and 1,076 (86*10+9*24). Therefore, if the period identified at 504 is 2,000, the method or system may determine that this identified period is invalid because it is too wide for a ten-track track pattern.

At 514, the method or system may identify or determine a legal track or a legal track pattern for the period. The method or system may further optionally forward predict track selections for a predetermined distance within the period or for a predetermined number of tracks for the identification or selection of a track for the track pattern at 516. In some of these embodiments, the method or system may predict the selections or identifications of the next five or fewer tracks for each identification or selection of a track for the track pattern. For each set of permissible widths to be associated with tracks in legal track patterns, there exists a threshold period beyond which the possible number of legal track patterns grows exponentially with the periodicity of the threshold period. That is, for any periods shorter than or equal to the threshold period, only a few legal combinations of tracks may be arranged within such a period. Therefore, the method or system may thus predict a number of possible next track selections for a limited distance within the period for each track selection to further expedite the track pattern identification or determination for the period.

At 518, the method or system may identify or determine whether or not the combination of the first track and the last track arranged immediately adjacent the first track violates one or more design rules in identical or substantially similar manners as those described for 408 of FIG. 4. At 520, the method or system may identify the first two tracks and the last two tracks and determine whether or not the last track and the first two tracks as well as the last two tracks and the first track comply with the triplet rule that govern which combinations of three widths associated with three adjacent wires are legal once the repetitive track patterns are formed in identical or substantially similar manners as those described for 410 of FIG. 4.

The method or system may then identify the remaining period from the period at 522 and identify or determine one or more legal widths to be associated with one or more intermediate tracks at 524 in identical or substantially similar manners as those described for 414 of FIG. 4. At 526, the method or system may then insert one or more intermediate tracks or dummy tracks in the remaining period for the track pattern. In some embodiments, the method or system may insert the one or more intermediate tracks while reducing the total number of different track patterns in the electronic design. It shall be noted that the term intermediate track and dummy track may be used interchangeably in this application.

Figure 6:
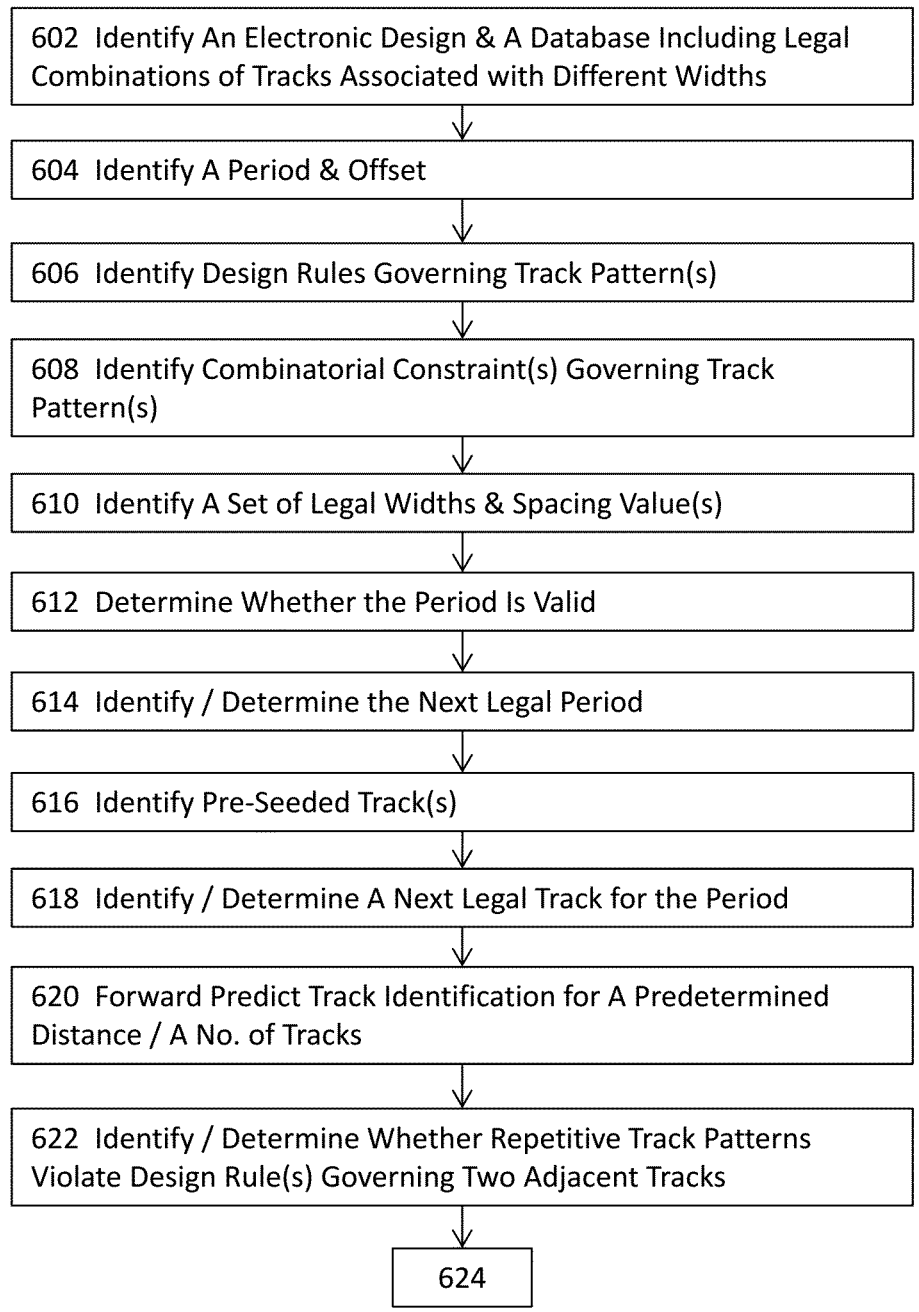
FIGS. 6 and 6A jointly illustrate another more detailed flow diagram for a method or system for implementing repetitive track patterns for electronic circuit designs in some embodiments.
Figure 6A:
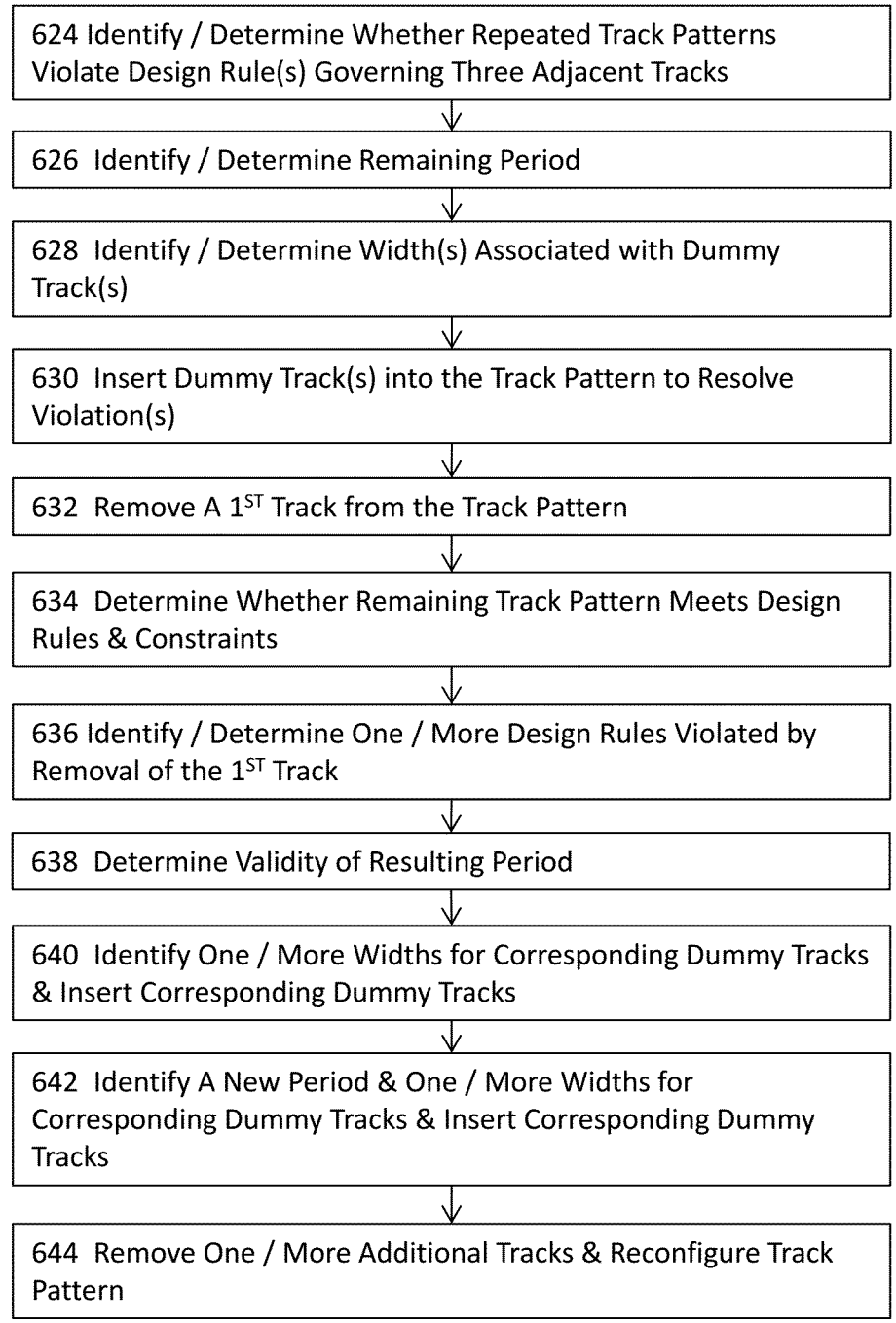

FIGS. 6 and 6A jointly illustrate another more detailed flow diagram for a method or system for implementing repetitive track patterns for electronic circuit designs in some embodiments. In these embodiments illustrated in FIG. 4, the method or system may identify an electronic design or a portion thereof at 602 in identical or substantially similar manners as those described for reference numeral 302 of FIG. 3. The method or system may also identify a database including a plurality of legal combinations of tracks associated with various widths or a plurality of legal track patterns at 602. A period and offset may be identified at 604 for a track pattern in the repetitive track patterns. A set of pertinent design rules governing tracks, track patterns, and the implementation of the electronic design may also be identified at 606.

At 608, the method or system may identify a combinatorial constraint governing the track patterns. For example, the method or system may identify or determine the constraint at 608 as described in the constraint relation (1) in the description for FIG. 2 above. The method or system may identify a set of legal widths and one or more spacing values at 610 and determine whether or not the period identified at 604 is valid at 612 in identical or substantially similar manners as those described for reference numeral 512 of FIG. 5. If the period identified at 604 is determined to be invalid, the method or system may identify or determine the next legal period at 614. In the above example provided for reference numeral 512 of FIG. 5, the method may identify, for example, a legal period between the upper bound and the lower bound to replace the period identified at 604.

In some embodiments, the method or system may consult the database, which includes a plurality of legal track patterns, and determine or identify a legal period by using at least the database. The method may identify a pre-seeded track pattern including one or more pre-seeded tracks at 618. The pre-seeded track pattern may only include some but not all of the tracks to occupy the entire period while satisfying various design rules, requirements, or constraints (collectively design rule or design rules hereinafter). At 620, the method or system or system may forward predict track selections for a predetermined distance within the period or for a predetermined number of tracks for the identification or selection of a track for the track pattern in identical or substantially similar manners as those described for reference numeral 406 of FIG. 4. At 622, the method or system may determine whether or not the repetitive track patterns violate any design rules governing two immediately adjacent tracks.

For example, the method or system may identify the first track and the last track in the track pattern and determine whether these two tracks have different photomask identifications. If these two track exhibit the same photomask identifications, the method or system may determine that there is a color violation because the first track of the second track pattern will be arranged immediately adjacent to the last track of the first track pattern in the repetitive track patterns. As another example, the method or system may consult the database identified at 602 or a pair-matrix or table including legal combinations of two widths associated with two immediately adjacent tracks and determine whether the respective widths associated with the first track and the last track constitute a legal combination of two widths for two immediately adjacent wires. If it is determined that the widths associated with the first track and the last track fail to comply with the pair design rule (or BC rule), the method or system may determine that repetitive track patterns cause a violation because the first track of the second track pattern will be arranged immediately adjacent to the last track of the first track pattern in the repetitive track patterns and thus need to comply with the pair design rule.

At 624, the method or system may determine whether or not the repetitive track patterns violate any design rules governing three immediately adjacent tracks. For example, the method or system may identify the first two tracks and the last two tracks and determine whether or not a first combination including the last track and the first two tracks as well as a second combination including the last two tracks and the first track comply with the triplet rule that govern which combinations of three widths associated with three adjacent wires are legal. At 626, the method may identify or determine the remaining period in the period identified at 604 or 618. In some embodiments, a remaining period includes the unallocated space with the period that has not been allocated to any tracks after the completion of the identification or implementation of the tracks for the track pattern.

The method or system may then identify one or more widths that may be respectively associated with one or more corresponding tracks at 628 according to the pertinent design rules such as the spacing rule, the pair design rule, and/or the triplet design rule. The method may then insert these one or more corresponding tracks into the track pattern to occupy the remaining period at 630. As described in FIG. 5, the method or system may identify the one or more widths while reducing the total number of track patterns for the electronic design in some embodiments.

Certain situations may arise when one or more tracks in a track pattern of repetitive track patterns are to be removed or even replaced (removal of the original track and insertion of a different track). In some embodiments, the method or system may thus remove a first track from the track pattern of repetitive track patterns at 632. The removal of a track pattern by itself may cause several violations. For example, removing a track associated with a first photomask results in two immediately adjacent tracks having the same photomask identification and thus causes a color violation. Moreover, removing a first track may cause its immediately adjacent tracks to become immediately neighboring tracks that may violate the pair or the triplet design rule.

The method or system may thus determine whether the remaining track pattern meets the pertinent design rules at 634 and further identify or determine one or more design rules violations caused by the removal of the first track at 636. At 638, the method or system may optionally determine whether the resulting period resulting from the removal of the first track is valid, although the resulting period will be valid if the original track pattern before the removal of the first track is determined to be legal. At 640, the method or system may identify one or more widths to be associated with one or more corresponding tracks to fill the remaining period left by the removal of the first track.

The identification or determination of the one or more widths may be based at least in part upon an objective to reduce or minimize the total number of track patterns in the electronic design in some embodiments. Therefore, the method or the system may consult the electronic design and identify the one or more widths at 640 accordingly to avoid creating a new track pattern, if possible. The one or more corresponding tracks respectively associated with the one or more widths may be inserted into the remaining period of the track pattern. In some embodiments where one track is removed from a track pattern, the method or system may insert an odd number of intermediate tracks to avoid color conflict or color violation. In addition or in the alternative, the method or system may leave the resulting period unoccupied if the pertinent design rules allow such a spacing value in the track pattern.

At 642, the method or system may identify a new sub-period for the resulting period or adjust the resulting period to a new value if the pertinent design rules allow such replacement or adjustment of the resulting period. The method or system may then identify one or more tracks associated with their respective widths as permitted by the design rules by using the new period value in place of the resulting period identified or determined at 638. At 644, the method or system may also optionally remove one or more additional tracks and reconfigure the remaining track pattern to satisfy various design rules. In some embodiments, the method or system may remove all the tracks following the first track and reconfigure the remainder of the track pattern.

In some of these embodiments, the method or system may remove all the tracks following the first track and reconfigure the remainder of the track pattern based at least in part upon these additionally removed tracks to result in a new track pattern that closely resembles the pattern formed by the additionally removed tracks. In some embodiments where a first track in a track pattern of repetitive track patterns is replaced by a second track, the method or system may first remove the first track and insert the second track by configuring the resulting period left by the removal of the first track, adding one or more intermediate track to one or both sides of the second track, or removing one or more additional tracks in the track pattern and reconfigure the remainder of the track pattern to include the second track.

FIG. 7A illustrates some illustrative regions including repetitive track patterns of a simplified electronic design to which various methods or systems for implementing repetitive track patterns applies in some embodiments. More specifically, FIG. 7A shows repetitive track patterns 702A with a period line 702A1 separating two identical track patterns. The repetitive track patterns 702A shows no design rule violations and thus includes no intermediate tracks. 704A illustrates another repetitive track patterns having a period line 704A1 where each track pattern includes the first track and the last track with three intervening tracks in between.

Both the first track and the last track in the track pattern are associated with the same photomask designation and thus the repetitive track patterns cause a color violation or color conflict. Various methods or processes described herein thus inserted an intermediate track 704A2 to resolve the color conflict. 706A illustrates another repetitive track patterns including two track patterns separated by a period line 706A2. Each track pattern includes the first track associated with a relative small width value and the last track associated with a relatively large width value. It is assumed that these two widths, when associated with two immediately adjacent tracks, are prohibited by the pair or BC design rule. As a result, the repetitive track patterns shown in 706A causes at least one design rule violation.

Various methods or systems may thus add one or more intermediate tracks 706A1 (two intermediate tracks in 706A) to resolve the design rule violation and to maintain the compliance with one or more other design rues (e.g., a spacing design rule). 708A illustrates repetitive track patterns including two track patterns separated by a period line 708A1. The repetitive track patterns cause a color violation or color conflict because both the first track and the last track in each track pattern are associated with the same photomask identification. It is also assumed that these two widths, when associated with two immediately adjacent tracks (the first track and the last track), are prohibited by the pair or BC design rule. As a result, the method or system described herein may insert one or more intermediate tracks (one intermediate track in 708A) to resolve both the BC design rule violation and the color conflict.

FIG. 7B illustrates an illustrative region including repetitive track patterns in some embodiments. More specifically, FIG. 7B illustrates repetitive track patterns where each track pattern includes some pre-seeded tracks—the first track 702B, the second track 704B, the next to the last track 706B, and the last track 708B. FIG. 7B further illustrates the scenarios where a user may start the electronic circuit design tool with a user specified period 710B to complete the track pattern that is further used to determine the repetitive track patterns for a number of repetitions. The period 710B is to be positioned with at least the minimum spacing or another spacing value 712B from track 708B. The track pattern in FIG. 7B is then to satisfy the relation (1): $P=\text{offset}+\Sigma_{i=1}^{N}(a_i \times (w_i+s))$ as described above with reference to FIG. 2.

The method or system described herein may check the period 710B to determine whether the period (or the remaining period in FIG. 7) is valid in identical or substantially similar manner as those described for FIGS. 5-6. Therefore, a user may provide or specify a period for repetitive track patterns, and the method or system described herein will check the validity of the user-specified period and identify or select the next legal period if the user specified period is invalid. As shown in FIG. 7E, which illustrates an illustrative region including repetitive track patterns illustrated in FIG. 7B and some operations of implementing repetitive track patterns in some embodiments. The implementation of the track pattern in the repetitive track patterns begins with the identification or determination of the first track 702E in the remaining period 710B.

The identification or determination of the first track 702E may need to satisfy various design rules including the BC design rule and the BCB design rule and thus depends on at least track 706B (for at least BCB design rule) and track 708B (for at least BC design rule, BCB design rule, and photomask designation). The identification or determination of the first track 702E may also need to consider the remaining period 710B and/or one or more other existing track patterns in the electronic design if it is an objective to reduce or minimize the total number of different track patterns in the electronic design.

FIG. 7C illustrates an illustrative table including a plurality of legal widths and respective sizes of the combinatorial space with a constant spacing value in some embodiments. More specifically, an electronic design may be confined to use a limited number of widths to route the wires. For example, FIG. 7C illustrates that some electronic designs may only be able to include wires with widths selected from a set of {32-nm, 34-nm, 38-nm, 40-nm, 46-nm, 58-nm, 62-nm, 70-nm, 76-nm, 78-nm, and 86-nm}. The other widths are not permitted in these electronic designs.

FIG. 7C further illustrates that the wires in these electronic design are subject to a constant spacing design rule that requires two immediately adjacent wires be spaced apart at 24-nm. Therefore, FIG. 7C includes the second column for the sum of each permissible wire width and the constant spacing value. The third column of FIG. 7C includes the maximum number of tracks to be associated with each wire width for a period of 1000-nm. For example, if the entire period of 1000-nm is to be allocated for tracks associated with 32-nm width, there may be a maximum of 17 such tracks because 18 32-nm tracks would require at least a 1008-nm period.

The fourth column specifies the size of the combinatorial space for each permissible wire width to be associated with a track. For example, if only 32-nm width may be associated with tracks in the period, there may be 17 possible combinations (from 1 to 17). Therefore, the size of the combinatorial space is 17. If both 32-nm and 34-nm widths may be associated with tracks in the period, there may be 17 (for 34-nm width) times 17 (for 32-nm width) or 289 possible combinations. If 32-nm, 34-nm, and 38-nm widths may be associated with tracks, there may be 16 (for 38-nm) times 289 (for both 32-nm and 34-nm widths) or 4624 possible combinations. Therefore, the size of the combinatorial space is 4624.

FIG. 7D illustrates an illustrative plot showing the number of linear combinations for a given periods with the plurality of legal widths and constant spacing value provided in FIG. 7C in some embodiments. More specifically, FIG. 7D illustrates the nearly exponential growth of the possible combinations for a given period with the increase in periods. In addition, FIG. 7D further illustrates that no all period values are valid for a given set of permissible widths shown in FIG. 7C. For example, the period values (e.g., 60, 68, etc.) that do not have any combinations of widths in FIG. 7D indicate invalid periods.

FIG. 7F illustrates an illustrative plot showing the number of linear combinations for a given periods with the range of 56 to 282 with the plurality of legal widths and constant spacing value provided in FIGS. 7C-D in some embodiments. More specifically, FIG. 7F illustrates that, for the given set of permissible widths shown in FIG. 7C, the number of legal track patterns until the end of a period for a periodicity up to 264-nm appears to be manageable. Nonetheless, the number of legal track patterns grows exponentially when the periodicity is beyond 264. It shall be noted that FIG. 7F is generated based at least in part on the information provided in FIG. 7C. Therefore, these numbers in the FIGS. 7C and 7F are not intended to limit the scope of other embodiments or the scope of the claims, unless otherwise specifically recited or claimed.

Figure 7G:
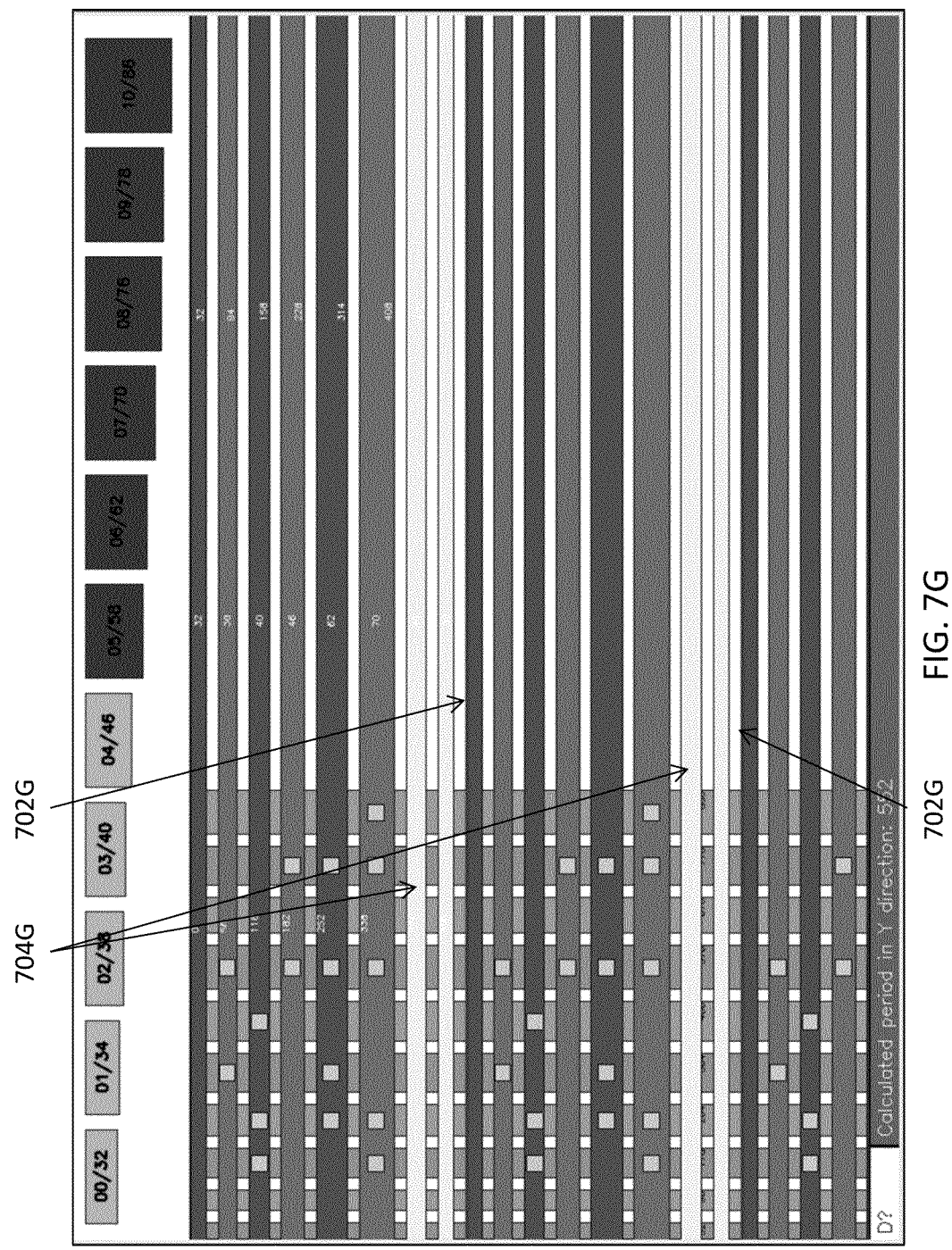
FIG. 7G illustrates an illustrative region including repetitive track patterns with identified periods generated by some processes or modules in two routing directions in some embodiments.

FIG. 7G illustrates an illustrative region including repetitive track patterns with identified periods generated by some processes or modules in two routing directions in some embodiments. More specifically, FIG. 7G shows two automatically identified or user specified period lines 702G for the horizontal tracks. Although the first track (from the upper period line of the track pattern) and the last track appear to satisfy the photomask identification rule, their respective widths are illegal as the pair design rule may have required. Therefore, FIG. 7G further shows the addition of two intermediate tracks 704G generated by some methods or systems as described above to resolve the pair design rule violation caused by the repetitive track patterns as shown in FIG. 7G.

System Architecture Overview

Figure 8:
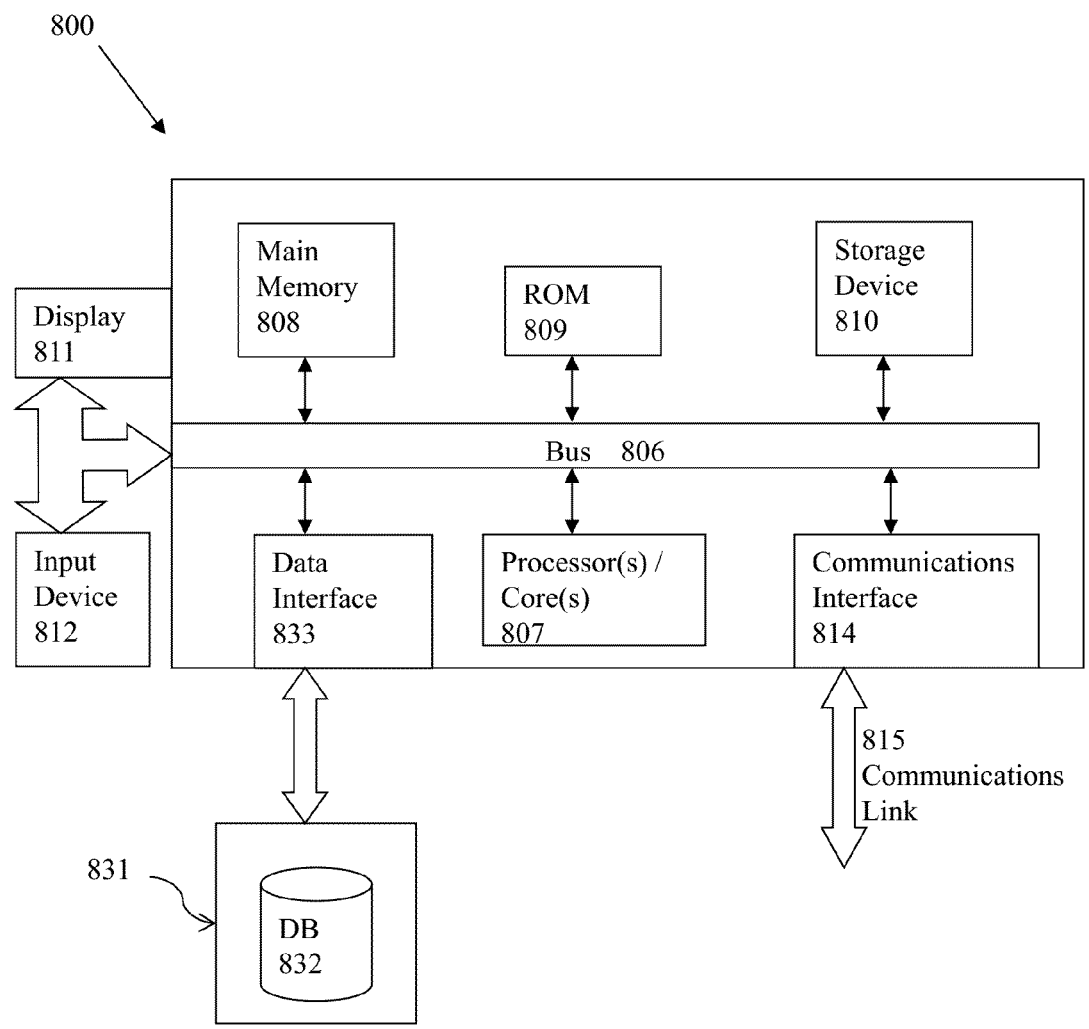
FIG. 8 illustrates a computerized system on which a method for implementing track patterns for electronic circuit designs can be implemented.

FIG. 8 illustrates a block diagram of an illustrative computing system 800 suitable for implementing repetitive track patterns for electronic circuit designs as described in the preceding paragraphs with reference to various figures. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control (not shown).

According to one embodiment, computer system 800 performs specific operations by one or more processor or processor cores 807 executing one or more sequences of one or more instructions contained in system memory 808. Such instructions may be read into system memory 808 from another computer readable/usable storage medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 807, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. In an embodiment, the computer system 800 operates in conjunction with a data storage system 831, e.g., a data storage system 831 including a database 832 that is readily accessible by the computer system 800. The computer system 800 communicates with the data storage system 831 through a data interface 833. A data interface 833, which is coupled to the bus 806, transmits and receives electrical, electromagnetic or optical signals that include data streams representing various types of signal information, e.g., instructions, messages and data. In embodiments of the invention, the functions of the data interface 833 may be performed by the communication interface 814.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing repetitive track patterns for electronic designs, comprising:
   using a computer system to execute a process, the process comprising:

identifying a period for a track pattern that is to be repeated to form repetitive track patterns for an electronic design;

identifying at least a part of a legal track pattern for the period, wherein the repetitive track patterns includes multiple adjacent occurrences of the track pattern;

determining whether the repetitive track patterns cause one or more violations by violating one or more design rules that are satisfied by the track pattern; and resolving the one or more violations by modifying the track pattern of the repetitive track patterns.

2. The computer implemented method of claim 1, the process further comprising:

identifying a set of design rules; and resolving the one or more violations by modifying the track pattern of the repetitive track patterns.

3. The computer implemented method of claim 2, the act of resolving the one or more violations comprising:

identifying a remaining period that is not allocated for tracks in the period in the electronic design; and inserting one or more intermediate tracks in the remaining period.

4. The computer implemented method of claim 3, the act of resolving the one or more violations further comprising:

identifying or determining one or more legal widths to be associated with the one or more intermediate tracks by using a database including a plurality of legal track patterns, wherein a track pattern includes one or more tracks that are arranged in an order and are respectively associated with corresponding widths.

5. The computer implemented method of claim 1, the process further comprising:

identifying a first track and a last track in the legal track pattern; and determining whether or not the first track and the last track satisfy a pair design rule or a photomask designation design rule.

6. The computer implemented method of claim 1, the process further comprising:

identifying first two tracks and last two track in the legal track pattern; and determining whether a first combination including one of the first two tracks and the last two tracks or a second combination including the first two tracks and one of the last two tracks satisfies a triplet rule.

7. The computer implemented method of claim 1, the process further comprising:

identifying a first track for the legal track pattern; and prior to identifying a second track immediately adjacent to the first track, forward predicting a predetermined number of tracks or one or more tracks within a predetermined distance from the first track after identifying the first track for the legal track pattern.

8. The computer implemented method of claim 1, the process further comprising:

identifying or determining one or more constraints governing validity of period values; and determining whether or not the period is valid based at least in part upon one or more permissible widths to be associated with tracks and a spacing value or upon the one or more constraints.

9. The computer implemented method of claim 1, the process further comprising:

identifying a first track in the legal track pattern that is to be repeated to form the repetitive track patterns;

removing the first track form the legal track pattern;

identifying or determining one or more design rules that are violated by removal of the first track from the legal track pattern; and performing one or more fixes to the legal track pattern to ensure compliance with the one or more design rules by the legal track pattern and the repetitive track patterns.

10. The computer implemented method of claim 9, wherein the one or more fixes include at least one of:

identifying or determining a first width combination for one or more first intermediate tracks and inserting the one or more first intermediate tracks into the legal track pattern;

identifying or determining a new period and a second width combination for one or more second intermediate tracks and inserting the one or more second intermediate tracks into the legal track pattern; and removing one or more additional tracks from the legal track pattern to form a resulting period and inserting one or more third intermediate track associated with respective widths to the resulting period.

11. A system for implementing repetitive track patterns for electronic designs, comprising:

a computer system including at least one processor or processor core that executes a sequence of instructions to:

identify a period for a track pattern that is to be repeated to form repetitive track patterns for an electronic design;

identify at least a part of a legal track pattern for the period, wherein the repetitive track patterns include multiple adjacent occurrences of the track pattern;

determine whether the repetitive track patterns cause one or more violations by violating one or more design rules that are satisfied by the track pattern; and resolve the one or more violations by modifying the track pattern of the repetitive track patterns.

12. The system of claim 11, wherein the at least one processor or processor core further executes the sequence of instructions to:

identify a set of design rules; and resolve the one or more violations by modifying the track pattern of the repetitive track patterns.

13. The system of claim 12, wherein the at least one processor or processor core executing the sequence of instruction to resolve the one or more violations further executes the sequence of instructions to:

identify a remaining period that is not allocated for tracks in the period in the electronic design; and insert one or more intermediate tracks in the remaining period.

14. The system of claim 11, wherein the at least one processor or processor core further executes:

a first sequence of instructions to:

identify a first track and a last track in the legal track pattern; and determine whether or not the first track and the last track satisfy a pair design rule or a photomask designation design rule; or a second sequence of instructions to:

identify first two tracks and last two track in the legal track pattern; and determine whether a first combination including one of the first two tracks and the last two tracks or a second combination including the first two tracks and one of the last two tracks satisfies a triplet rule.

15. The system of claim 11, wherein the at least one processor or processor core further executes the sequence of instructions to:

a first sequence of instructions to:
  identify or determine one or more constraints governing validity of period values; and
  determine whether or not the period is valid based at least in part upon one or more permissible widths to be associated with tracks and a spacing value or upon the one or more constraints; or
a second sequence of instructions to:
  identify a first track in the legal track pattern that is to be repeated to form the repetitive track patterns;
  remove the first track form the legal track pattern;
  identify or determine one or more design rules that are violated by removal of the first track from the legal track pattern; and
  perform one or more fixes to the legal track pattern to ensure compliance with the one or more design rules by the legal track pattern and the repetitive track patterns.

16. An article of manufacture comprising a non-transitory computer accessible storage medium having stored thereupon a sequence of instructions which, when executed by at least one customizable processor executing one or more threads, causes the at least one customizable processor to perform a method for implementing repetitive track patterns for electronic designs, the method comprising:
  using a computer system to execute a process, the process comprising:
  identifying a period for a track pattern that is to be repeated to form repetitive track patterns for an electronic design;
  identifying at least a part of a legal track pattern for the period, wherein the repetitive track patterns includes multiple adjacent occurrences of the track pattern;
  determining whether the repetitive track patterns cause one or more violations by violating one or more design rules that are satisfied by the track pattern; and
  resolving the one or more violations by modifying the track pattern of the repetitive track patterns.

17. The article of manufacture of claim 16, the process further comprising:
  identifying a set of design rules; and
  resolving the one or more violations by modifying the track pattern of the repetitive track patterns.

18. The article of manufacture of claim 17, further comprising:
  identifying a remaining period that is not allocated for tracks in the period in the electronic design; and
  inserting one or more intermediate tracks in the remaining period.

19. The article of manufacture of claim 16, further comprising:
  a first set of actions including:
    identifying a first track and a last track in the legal track pattern; and
    determining whether or not the first track and the last track satisfy a pair design rule or a photomask designation design rule; or
  a second set of actions including:
    identifying first two tracks and last two track in the legal track pattern; and
    determining whether a first combination including one of the first two tracks and the last two tracks or a second combination including the first two tracks and one of the last two tracks satisfies a triplet rule.

20. The article of manufacture of claim 16, the process further comprising:
  a first set of actions including:
    identifying or determining one or more constraints governing validity of period values; and
    determining whether or not the period is valid based at least in part upon one or more permissible widths to be associated with tracks and a spacing value or upon the one or more constraints; or
  a second set of actions including:
    identifying a first track in the legal track pattern that is to be repeated to form the repetitive track patterns;
    removing the first track form the legal track pattern;
    identifying or determining one or more design rules that are violated by removal of the first track from the legal track pattern; and
    performing one or more fixes to the legal track pattern to ensure compliance with the one or more design rules by the legal track pattern and the repetitive track patterns.

* * * * *